US012285853B2

(12) United States Patent
Langan

(10) Patent No.: US 12,285,853 B2
(45) Date of Patent: Apr. 29, 2025

(54) AXE ATTACHMENT TO MULTI-PURPOSE TOOL

(71) Applicant: Timothy Langan, Mission Viejo, CA (US)

(72) Inventor: Timothy Langan, Mission Viejo, CA (US)

( * ) Notice: Subject to any disclaimer, the term of this patent is extended or adjusted under 35 U.S.C. 154(b) by 0 days.

(21) Appl. No.: 16/403,438

(22) Filed: May 3, 2019

(65) Prior Publication Data

US 2020/0361072 A1 Nov. 19, 2020

Related U.S. Application Data

(60) Provisional application No. 62/666,654, filed on May 3, 2018.

(51) Int. Cl.
*B25F 1/00* (2006.01)
*B25F 1/02* (2006.01)

(52) U.S. Cl.
CPC ................ *B25F 1/006* (2013.01); *B25F 1/02* (2013.01)

(58) Field of Classification Search
CPC ............... B25D 1/02; B25F 1/006; B25F 1/02
USPC .................................................... 7/145; 81/25
See application file for complete search history.

(56) References Cited

U.S. PATENT DOCUMENTS 637,253 A * 11/1899 Harris ..................... B25C 11/02 30/308
868,733 A * 10/1907 Walker .................... B25F 1/006 254/26 R
1,541,373 A * 6/1925 Micek ........................ B25F 1/04 30/308.3
2,763,172 A * 9/1956 Richards .................. B21D 1/06 D8/77
3,186,456 A * 6/1965 Glasgow .................. B25D 1/02 81/25
4,287,623 A * 9/1981 Tarran .................... B23D 29/02 7/158
5,315,725 A * 5/1994 Vanden Heuvel ........ B25F 1/00 7/145
5,507,051 A * 4/1996 Mazon ................... A01B 1/022 7/104
9,021,642 B1 * 5/2015 Fox ......................... B25F 1/006 7/145

(Continued)

OTHER PUBLICATIONS

TACTAXE. Webpage [online]. MeleeMods, 2014 [Archived webpage from Dec. 27, 2014 retrieved Apr. 8, 2021]. Retrieved from the Internet: <URL:http://web.archive.org/web/20141227000253/http://www.meleemods.com/index.html>. (Year: 2014).*

*Primary Examiner* — Joel D Crandall
*Assistant Examiner* — Jonathan R Zaworski

(57) ABSTRACT

A modular combination axe head with a mechanical system that allows multiple configurations of other modular attachments; such as a sledge hammer and pick that is particularly designed for use by firefighters or military as a tactical entry tool. The axe includes a front end and a rear end. The front end has an upper section that functions as an axe blade and the lower section functions as a brush hook or. The rear section includes a pick that can be utilized for a variety of functions. By incorporating three tools in a single structure the weight that a firefighter carries is lessened. Thus, reducing fatigue and the time that is required to cut through an obstruction to reach fire victims.

5 Claims, 5 Drawing Sheets

(56) References Cited

U.S. PATENT DOCUMENTS

| | | | | |
|---|---|---|---|---|
| 2004/0261188 | A1 * | 12/2004 | Mathis | B25D 1/00<br>7/145 |
| 2006/0075572 | A1 * | 4/2006 | Young | B25F 1/006<br>7/138 |
| 2010/0263133 | A1 * | 10/2010 | Langan | B25D 1/00<br>7/143 |
| 2012/0098282 | A1 * | 4/2012 | Langan | A01B 1/20<br>294/49 |
| 2012/0111587 | A1 * | 5/2012 | Chu | E02F 3/966<br>172/101 |
| 2013/0139325 | A1 * | 6/2013 | Walker | B25F 1/006<br>7/145 |
| 2015/0360362 | A1 * | 12/2015 | Chapman | B25H 3/006<br>7/145 |
| 2016/0176036 | A1 * | 6/2016 | Langan | B25J 1/04<br>2/422 |
| 2018/0297188 | A1 * | 10/2018 | McCann | A62B 3/005 |
| 2020/0361072 | A1 * | 11/2020 | Langan | B25F 1/006 |

* cited by examiner

AXE ATTACHMENT TO MULTI-PURPOSE TOOL

CROSS REFERENCE TO RELATED APPLICATIONS

This application claims the benefit of U.S. Provisional Application Ser. No. 62/666,654, filed May 3, 2018, the entire disclosure of which is incorporated herein by reference.

FIELD OF THE INVENTION

The field of the invention is multi-purpose tools and tool attachments.

BACKGROUND

An axe is a useful tool, especially in emergency rescue and tactical entry (e.g., fire fighters, law enforcement), outdoor adventures, mountaineering/backpacking/camping, military, and aerospace. Moreover, since weight and space are often limited, there is a need for an improved axe that optimizes the following characteristics: (i) light weight; (ii) compact; (iii) high strength; (iv) adaptable.

SUMMARY OF THE INVENTION

The claimed subject matter is a modular axe attachment. The axe attachment can inflict severe damage to soft or hard targets. It is especially suitable for breaking down fortified barriers or used to gain entry into walls, locked doors, roofs, as well as deforestation.

The axe attachment is modular and adaptable. It has angled geometry for better cutting and biomechanical use. Its geometry is angled for better balance, performance, and efficiency for chosen work load which is enhanced by the modular attached connection mechanism. Its geometry has specifically placed through holes, external connectors and individual attachments for multiple applications of use such as twisting, punching, or striking, prying, cutting, digging, trenching, breaching, ventilating, vehicle extrication, leverage (forced traction), anchor, wedge and demolition.

In preferred embodiments, the axe is made of 17-4 heat treated stainless steel. It is compact, light-weight, durable, and robust. The reason for serration on the top spine is to aid in cutting, ripping, and tearing through tough materials that resist cutting with a regular single smooth blade edge.

In one embodiment, the axe with the pick attachment has a 10.5" total head length on a traditional style bit axe 4" inch blade on one end. The axe attachment can be advantageously configured to fit standard scabbards and axe racks. It can be attached to another multi-purpose tool. It has anti-vibration and secure handling features when connected to the SERE OS100 Multi-Purpose Bar.

In one embodiment, the axe with the hammer attachment has an 8.1" inch head length on a traditional style bit axe 4" inch blade on one end.

The SERE Axe offers a more modular distributed load which creates more cargo space increasing range of transport and expeditionary movement. SERE supports lighter vehicles that increase speed, and mission execution. It advantageously leverages every ounce of the load-in and load-out.

In preferred embodiments, the axe attachment has a Picatinny rail/MIL-STD-1913—Dove-tail connection for interchangeable rear axe attachments. Other preferred embodiments can include one or more of the following components/features:

A. Spanner wrench
B. 1¼" Hydrant wrench
C. Serrated teeth for pulling wire
D. 1½" Hex Nut remover
E. ¼" Female-Hex Bit Holder
F. "Fish Scaler/Saw Tooth
G. Notch for cutting rope/Cord/Canvas
H. Through holes for carabiners, cordage, rope, mole straps or multiple attachments (not limited) i.e. Hand carry hold In preferred embodiments, the rear of the axe allows for interchangeable components, which can include one or more of the following components/features:

Hammer
Pick/Pike Head
Mattock blade/Shovel Head
Log Splitter Axe/Hoe
Claw Fork
Adze
Rake
Spade
Brush Hook
Pry Wedge

BRIEF DESCRIPTION OF THE DRAWING

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1:
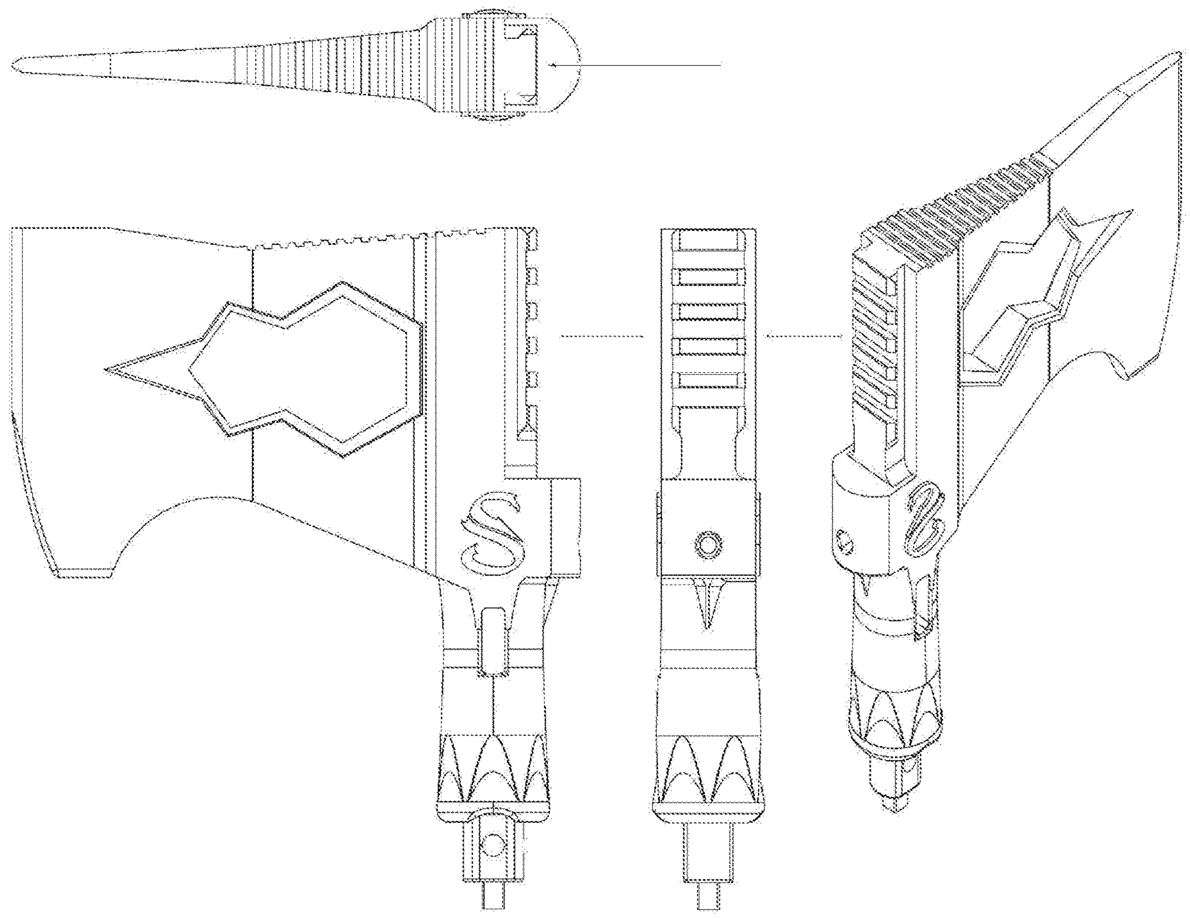
FIG. 1 shows Picatinny rail/MIL-STD-1913—Dove-tail connection
Figure 2:
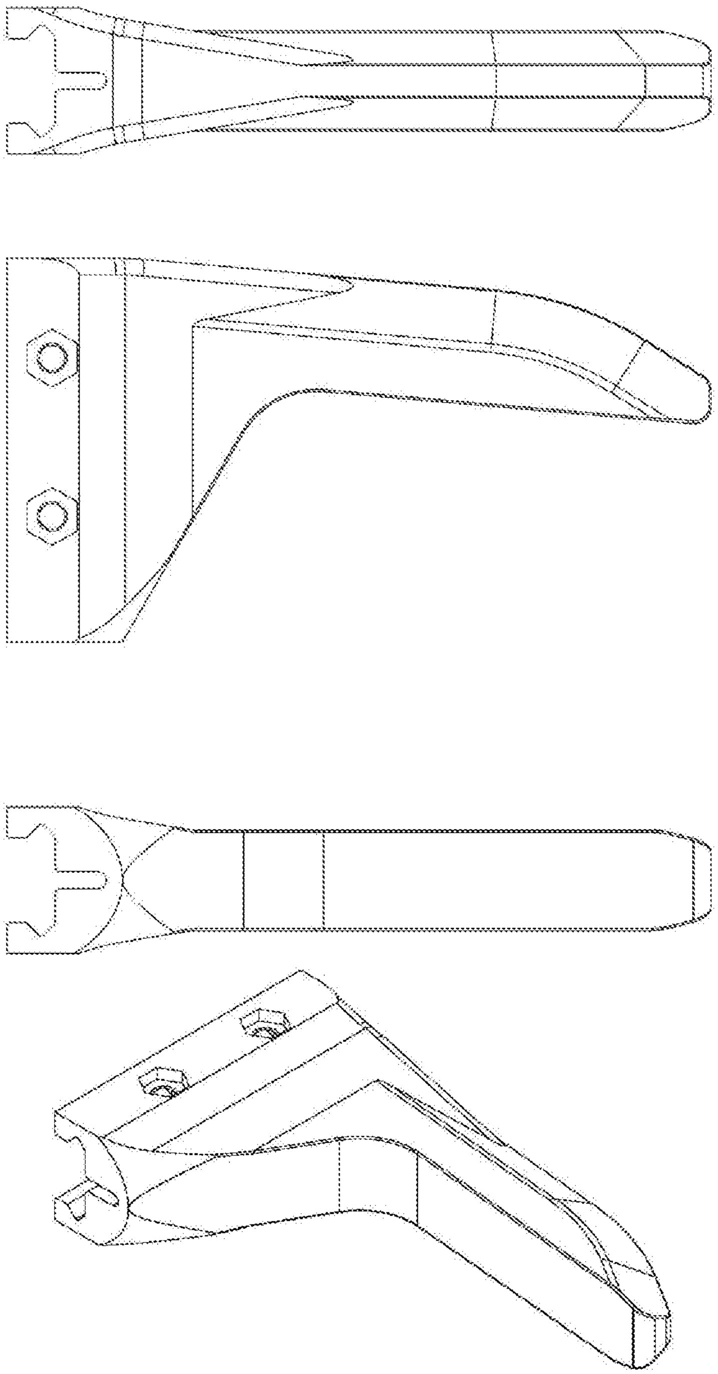
FIG. 2 is an axe pick.
Figure 3:
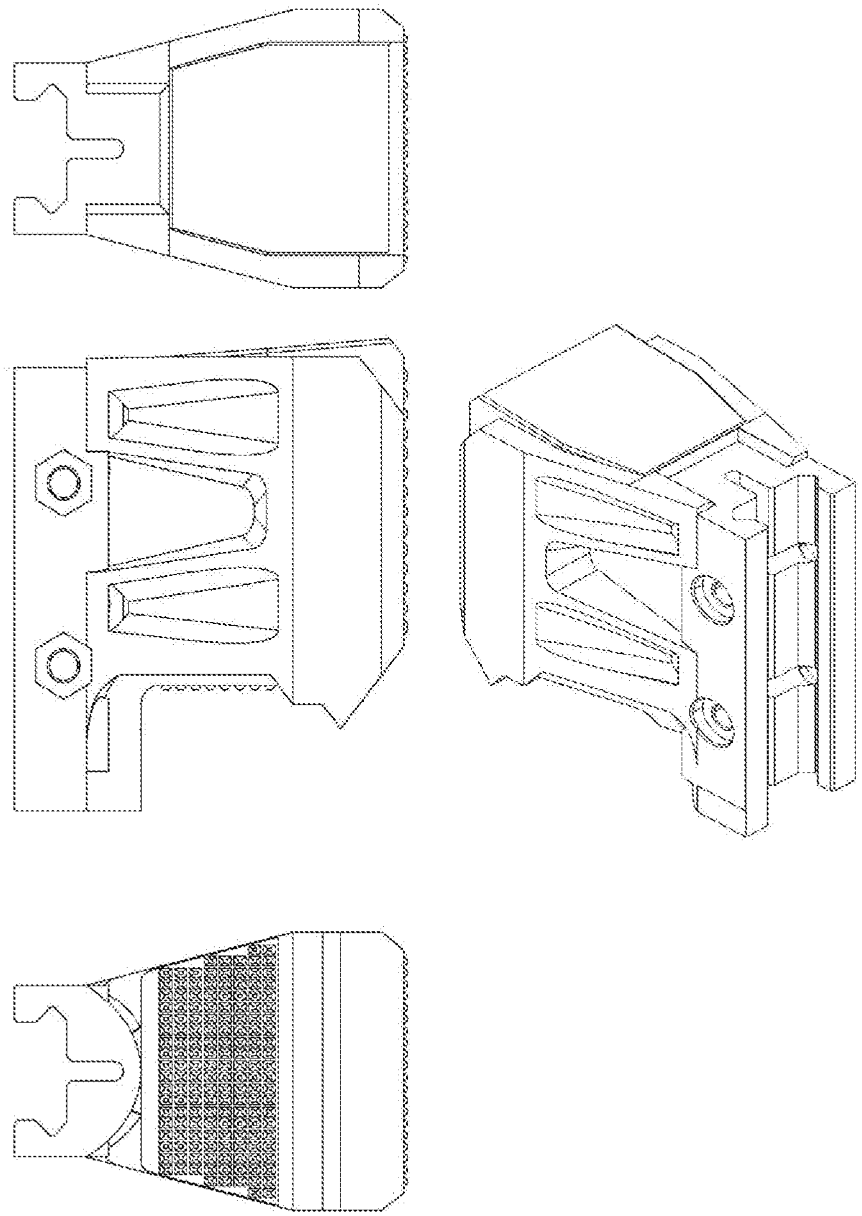
FIG. 3 is an axe hammer.
Figure 4:
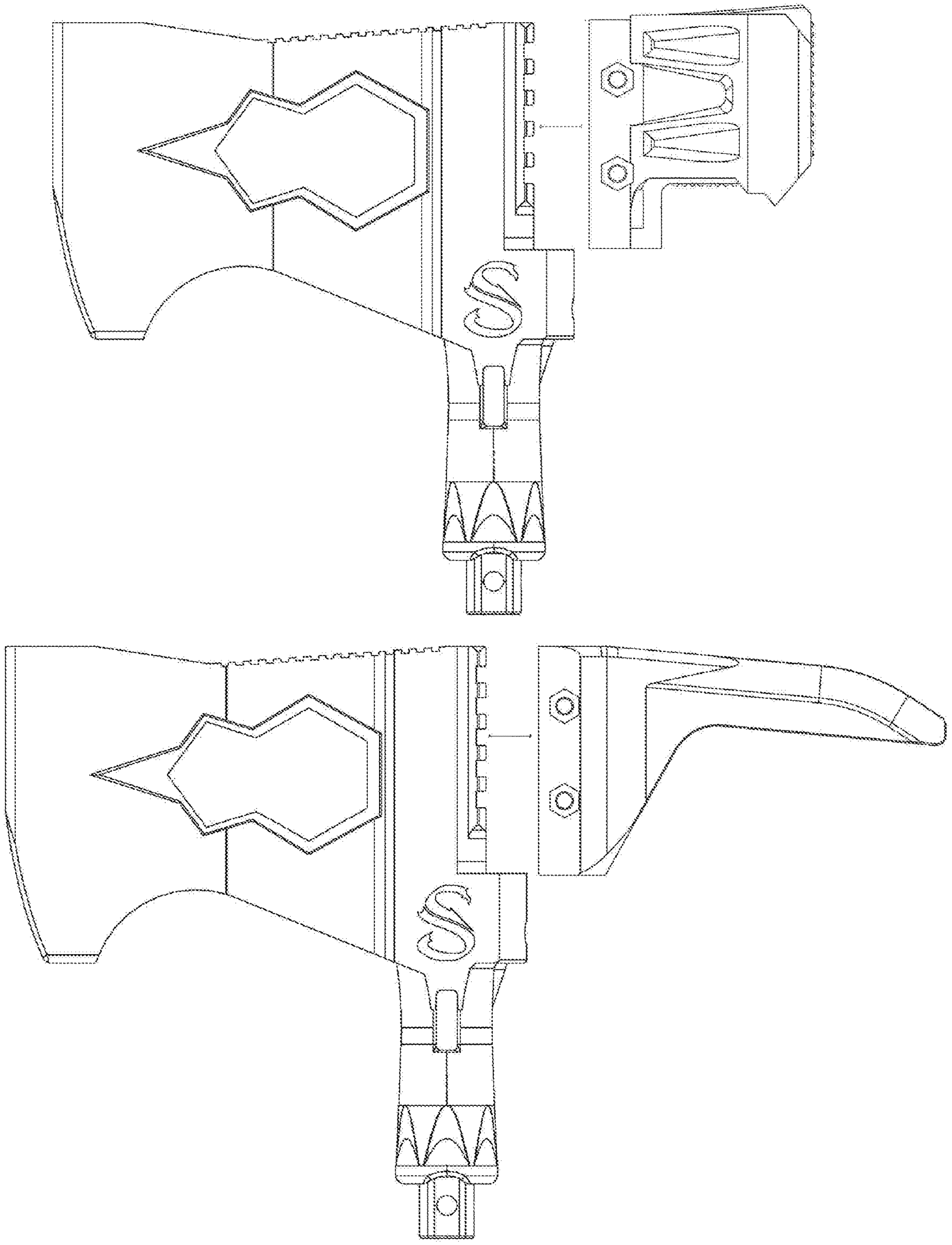
FIG. 4 is a set of tools, including an axe attachment, an axe attachment with an axe pick, and an axe hammer.
Figure 5:
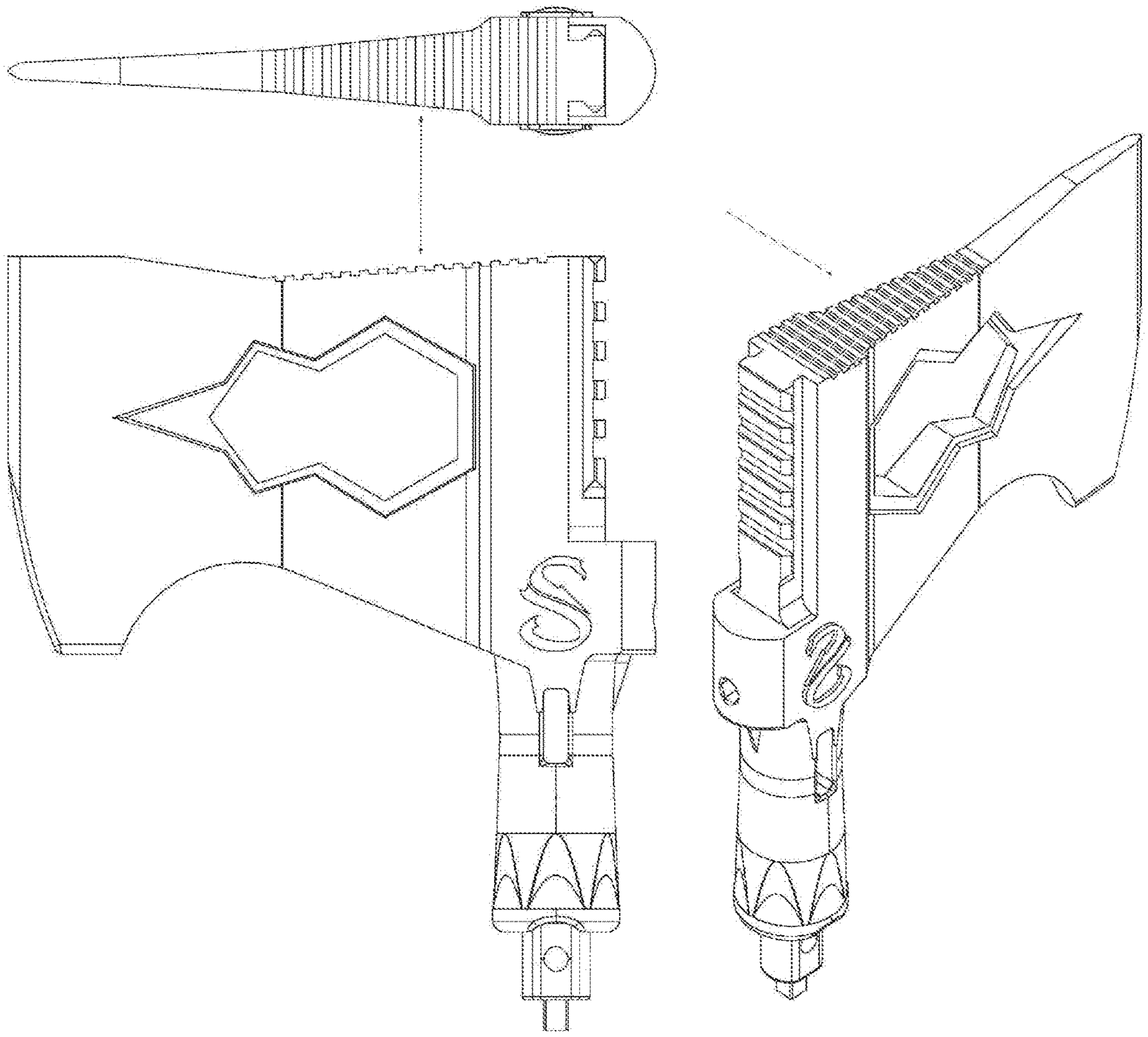
FIG. 5 top of spine is a fish scaler/saw tooth

The following publications, including their priority applications, are incorporated by reference to the same extent as if each individual publication or patent application were specifically and individually indicated to be incorporated by reference: United States Patent Application Publication US 2016/0176036A1 (application Ser. No. 14/902,817); U.S. Pat. No. 8,739,319 B2 (application Ser. No. 13/889,303); United States Design Patent U.S. D744,169 S (application Ser. No. 29/466,178)

The invention claimed is:

1. An axe head, comprising:

a single steel structure that includes a blade portion with a blade end, an attachment portion opposite the blade end, and a shaft extending from the attachment portion;

wherein the attachment portion is configured as a Picatinny rail;

wherein the blade portion has an opening configured to operate as a multi-wrench portion; and wherein the shaft has a connector configured to mate with a multipurpose bar.

2. The axe head of claim 1, further comprising an axe pick or a hammer coupled to the axe head via the attachment portion.

3. The axe head of claim 1, wherein the blade portion has a top spine with a serration.

4. The axe head of claim 1, wherein the multi-wrench portion comprises a 1¼ inch hydrant wrench portion and a 1½ inch hex nut wrench portion.

5. The axe head of claim 1, wherein the steel is stainless steel.

* * * * *